United States Patent
Luebbert et al.

(10) Patent No.: US 9,244,164 B2
(45) Date of Patent: Jan. 26, 2016

(54) METHOD FOR UNAMBIGUOUSLY DETERMINING A RANGE AND/OR A RELATIVE SPEED OF AN OBJECT, DRIVER ASSISTANCE DEVICE AND MOTOR VEHICLE

(75) Inventors: Urs Luebbert, Bietigheim-Bissingen (DE); Udo Haberland, Holzgerlingen (DE)

(73) Assignee: VALEO Schalter und Sensoren GmbH, Bietigheim-Bissingen (DE)

(*) Notice: Subject to any disclaimer, the term of this patent is extended or adjusted under 35 U.S.C. 154(b) by 478 days.

(21) Appl. No.: 13/510,014

(22) PCT Filed: Dec. 6, 2010

(86) PCT No.: PCT/EP2010/007382
§ 371 (c)(1),
(2), (4) Date: May 16, 2012

(87) PCT Pub. No.: WO2011/066993
PCT Pub. Date: Jun. 9, 2011

(65) Prior Publication Data
US 2012/0242530 A1    Sep. 27, 2012

(30) Foreign Application Priority Data
Dec. 5, 2009 (DE) .......... 10 2009 057 191

(51) Int. Cl.
*G01S 13/00* (2006.01)
*G01S 13/93* (2006.01)
(Continued)

(52) U.S. Cl.
CPC ............... *G01S 13/931* (2013.01); *G01S 13/22* (2013.01); *G01S 13/282* (2013.01); *G01S 13/343* (2013.01); *G01S 13/48* (2013.01); *G01S 13/582* (2013.01); *G01S 13/87* (2013.01); *G01S 2013/9321* (2013.01); *G01S 2013/9332* (2013.01); *G01S 2013/9389* (2013.01)

(58) Field of Classification Search
CPC ............... G01S 13/282; G01S 13/584; G01S 2013/9321; G01S 2013/9332; G01S 2013/9389

USPC ............................... 342/70, 104, 107
See application file for complete search history.

(56) References Cited

U.S. PATENT DOCUMENTS 4,053,884 A   10/1977 Cantrell et al.
4,524,361 A *  6/1985 Teulings ................ 342/201
(Continued)

FOREIGN PATENT DOCUMENTS

DE    10 2005 048209 A1    4/2007
DE    10 2006 020943 A1    11/2007
EP     1 186 907 A1         3/2002

OTHER PUBLICATIONS

International Search Report w/translation from PCT/EP2010/007382 dated Jun. 6, 2011 (5 pages).

*Primary Examiner* — John B Sotomayor
*Assistant Examiner* — Marcus Windrich
(74) *Attorney, Agent, or Firm* — Osha Liang LLP

(57) ABSTRACT

A method for unambiguous determination of a range to and/or of a relative velocity of an object with respect to a motor vehicle is disclosed. An unambiguity area (RUn) for the range and/or an unambiguity area (VUn) for the relative velocity may be determined by means of a frequency-modulation continuous-wave radar in the motor vehicle, with a predetermined sequence of frequency-modulated signal pulses being transmitted by the frequency-modulation continuous-wave radar in a measurement cycle. Mutually different unambiguity areas (RUn) for the range and/or mutually different unambiguity areas (VUn) for the relative velocity are defined for at least two successive measurement cycles, and the range and/or the relative velocity are/is determined on the basis of, in each case, at least one measured value for the range and/or for the relative velocity from each measurement cycle.

7 Claims, 2 Drawing Sheets

(51) Int. Cl.

| | |
|---|---|
| *G01S 13/22* | (2006.01) |
| *G01S 13/28* | (2006.01) |
| *G01S 13/34* | (2006.01) |
| *G01S 13/48* | (2006.01) |
| *G01S 13/58* | (2006.01) |
| *G01S 13/87* | (2006.01) |

(56) References Cited

U.S. PATENT DOCUMENTS

| | | | |
|---|---|---|---|
| 5,361,072 A * | 11/1994 | Barrick et al. | 342/133 |
| 5,657,022 A | 8/1997 | Van Etten et al. | |
| 6,587,074 B1 | 7/2003 | Winter et al. | |
| 7,385,550 B2 * | 6/2008 | Winter et al. | 342/70 |
| 7,420,502 B2 * | 9/2008 | Hartzstein et al. | 342/70 |
| 7,786,927 B2 * | 8/2010 | Kondoh | 342/109 |
| 8,203,481 B2 * | 6/2012 | Wintermantel et al. | 342/112 |
| 8,410,976 B2 * | 4/2013 | Szajnowski et al. | 342/131 |
| 2002/0130810 A1 * | 9/2002 | Gottwald et al. | 342/159 |
| 2004/0004567 A1 * | 1/2004 | Kroeger et al. | 342/109 |
| 2004/0246167 A1 * | 12/2004 | Kumon et al. | 342/70 |
| 2005/0225481 A1 * | 10/2005 | Bonthron | 342/175 |
| 2006/0250293 A1 * | 11/2006 | Jenkins et al. | 342/21 |

* cited by examiner

METHOD FOR UNAMBIGUOUSLY DETERMINING A RANGE AND/OR A RELATIVE SPEED OF AN OBJECT, DRIVER ASSISTANCE DEVICE AND MOTOR VEHICLE

BACKGROUND OF THE INVENTION

The invention relates to a method for unambiguous determination of a range to and/or of a relative velocity of an object with respect to a motor vehicle by means of a frequency-modulation continuous-wave radar in the motor vehicle. The frequency-modulation continuous-wave radar transmits a predetermined sequence of frequency-modulated signal pulses (Chirps) in an individual measurement cycle. An unambiguity area for the determination of the range and/or an unambiguity area for the determination of the relative velocity are/is determined by the sequence of frequency-modulated signal pulses. The invention also relates to a driver assistance device and to a vehicle having a driver assistance device such as this.

The present interest therefore relates to a frequency-modulation continuous-wave radar (frequency modulated continuous wave radar). This is referred to in the following text as an FMCW radar, or simply as a radar. A radar such as this operates as follows: the radar transmits a predetermined number of frequency-modulated signal pulses (also referred to by the term "Chirps") as a transmitted signal in a measurement cycle. The radar then receives a received signal, which is the transmitted signal reflected by an object. The transmitted signal is compared with the received signal. Two major measurement variables of the radar are the range and the relative velocity. The range is determined by the delay time of the transmitted signal; the relative velocity is determined by the change in the frequency of the transmitted signal, resulting from the Doppler effect.

The use of radars such as these in motor vehicles is already known from the prior art. The document DE 10 2005 048 209 A1 describes a motor vehicle having an FMCW radar such as this. This method is distinguished in that only the range but not the relative velocity is determined in predetermined time periods within a measurement cycle, for objects in at least one subarea of the area around the motor vehicle. A sequence of 16 to 64 frequency-modulated signal pulses, each having a time duration of about 250 µs, is transmitted by the radar in one measurement cycle and per radar lobe (per beam); the received signal for the entire sequence of signal pulses is then evaluated coherently. This allows a relatively high Doppler-frequency resolution and a relatively high signal-to-noise ratio (SNR), while at the same time making good use of the available measurement time. The parameters of the transmitted signal and the system parameters were chosen such that good measurement results could be achieved using the existing components, specifically in particular on the basis of the chosen time duration of the individual signal pulse of 250 µs, and on the basis of a sampling rate of an analogue-digital converter for the received signal. In this case, the sampling rate is 1 MHz.

In reality, the measurement of the two variables—the range and the relative velocity—is subject to limitations: the resolution and the unambiguity of the measurement are restricted. In principle, a radar can process a plurality of targets at the same time. The resolution capability of the radar indicates how far the targets must be apart from one another in order to allow the radar to detect them as two separate targets. Both range and velocity resolution are possible for targets using the radar according to document DE 2005 048 209 A1. By way of example, a range resolution of 1 m means that the range from the radar to two targets must differ by at least one 1 m in order to allow them to be resolved by the radar.

As already stated, the range measurement and the relative velocity measurement may be ambiguous. In general, this results from sampling effects. The ambiguity problem is illustrated by the following example: by way of example, a radar can detect targets up to a maximum range of 300 m. The range unambiguity (the unambiguity area) may, however, for example be 100 m, and therefore significantly below the maximum range of the radar. In this case, a measured value for the range of about 10 m means that the target may be at a range of 10 m, 110 m or 210 m away from the radar.

The choice of the parameters for the transmitted signal, as well as the system parameters, influences the unambiguity area for the determination of the range and the unambiguity area for the determination of the velocity. As stated above, in the case of the parameters mentioned, the unambiguity area for the range is about 100 m, and the unambiguity area for the determination of the velocity is about 80 km/h. However, in practice, the radar can also detect targets which are at a range of considerably more than 100 m away from the radar. In practice, in particular on motorways, relative velocities may additionally occur between −200 km/h and +200 km/h. There is therefore a major requirement to increase the unambiguity areas for the range and the velocity overall.

In order to increase the unambiguity area for determination of the range, in principle it will be possible to increase the sampling rate of the analogue/digital converter in the receiver. However, this solution is not optimal. Increasing the sampling rate of the analogue-digital converter increases the costs for this component. On the other hand, the unambiguity area for determination of the velocity could be increased by reducing the time duration of an individual frequency-modulated signal pulse. However, in this case, the sampling rate of the analogue/digital converter would then have to be correspondingly increased in order to keep the range resolution constant; in addition, correspondingly more signal pulses would have to be transmitted for the same Doppler-frequency resolution. This once again results in the problem of increased hardware costs.

BRIEF SUMMARY OF THE INVENTION

The object of the invention is to indicate a solution as to how, in the case of a method of the generic type mentioned initially, the unambiguity area for the determination of the range and/or the unambiguity area for the determination of the relative velocity can be increased overall in comparison to the prior art.

According to the invention, this object is achieved a method having by the features according to patent claim 1, as well as by a driver assistance device having the features according to patent claim 9, and a motor vehicle having the features according to patent claim 10. Advantageous embodiments of the invention are the subject matter of the dependent patent claims and of the description.

A method according to the invention is designed for unambiguous determination of a range to and/or of a relative velocity of an object with respect to a motor vehicle by means of an FMCW radar in the motor vehicle. The radar transmits a predetermined sequence of frequency-modulated signal pulses (Chirps) in a measurement cycle. The predetermined sequence of frequency-modulated signal pulses predetermines an unambiguity area for the range, and/or an unambiguity area for the relative velocity. According to the invention, at least two—in particular immediately successive—measurement cycles are provided, whose unambiguity areas for the range and/or whose unambiguity areas for the relative velocity differ from one another. The range and/or the relative velocity are/is then determined on the basis of in each case at least one measured value for the range and the relative velocity from each measurement cycle.

This means that mutually different unambiguity areas for the range and/or mutually different unambiguity areas for the relative velocity are predetermined for at least two successive measurement cycles. For example, the radar can transmit one such sequence of frequency-modulated signal pulses in a first measurement cycle, defining a first unambiguity area for the range and a first unambiguity area for the relative velocity. In a second measurement cycle, for example, the radar can transmit one such sequence of frequency-modulated signal pulses, by means of which a second unambiguity area for the range and a second unambiguity area for the relative velocity are predetermined. This makes it possible, overall, to increase the unambiguity area for the range and/or the unambiguity area for the relative velocity in comparison to the prior art, and therefore to ensure unambiguous determination of the range and/or of the relative velocity. The invention therefore builds on the knowledge that a plurality of measurements with different unambiguity areas can be used to increase the overall unambiguity area of the overall measurement. A less ambiguous measurement value can then be deduced by comparison of the measured values from the ambiguous measurements.

Particularly preferably, both different unambiguity areas for the range and different unambiguity areas for the relative velocity are predetermined for at least two successive measurement cycles. Overall, this makes it possible to increase the two unambiguity areas of the overall measurement in comparison to the prior art, ensuring unambiguous measurements.

In principle, the sampling rate of an analogue/digital converter in a receiver in the radar can be varied between at least two different measurement cycles in order to define different unambiguity areas for the range. However, it has been found to be advantageous for the definition of different unambiguity areas for the range to include mutually different frequency shifts being set for the respective sequences of frequency-modulated signal pulses. This means that different frequency shifts are in each case predetermined for the sequences of signal pulses in the at least two measurement cycles. For example, a first frequency shift can be set for the entire sequence of frequency-modulated signal pulses in a first measurement cycle; a different, second frequency shift can be set for the entire sequence of frequency-modulated signal pulses in a second measurement cycle. The unambiguity area for the range can be changed in a technically simple manner by changing the frequency shift. It is also worthwhile combining the change in the frequency shift between the individual measurement cycles with the change in the sampling rate of the analogue/digital converter.

The frequency shift can therefore be varied from one measurement cycle to another. This embodiment may be implemented, for example, in a scenario such as this: a frequency shift of 250 MHz is used for a mean frequency of 24 GHz in a first measurement cycle. A frequency shift of 257 MHz is set in a second measurement cycle. A frequency shift of 264 MHz is defined in a third measurement cycle. Therefore, the frequency shifts can be varied only slightly. The unambiguity area for determination of the range is changed in each measurement cycle, and therefore for each measurement, by changing the frequency shifts. As is stated further below, the determination of the range does not, however, relate to the resolution of ambiguities, but preferably only to sorting out those targets which are located outside the respective ambiguity areas of the range (so-called excess ranges).

The definition of different unambiguity areas for the relative velocity may include mutually different pulse repetition frequencies being set for the respective sequences of frequency-modulated signal pulses. This means that different pulse repetition frequencies can in each case be set for at least two successive measurement cycles. For example, a first pulse repetition frequency may be defined for the entire sequence of frequency-modulated signal pulses in a first cycle; by way of example, a second pulse repetition frequency may be set for the sequence of frequency-modulated signal pulses in a second measurement cycle. By way of example, this can appear as if the pulse repetition frequency is varied between the measurement cycles such that a pause of predetermined time duration is introduced between the individual frequency-modulated signal pulses. This pause can then be varied from one measurement cycle to another. The ambiguity area for the determination of the relative velocity is therefore changed for each measurement. Specifically, three different time durations are used for the pause. In a first measurement cycle, a time duration for the pause between the individual signal pulses of about 144 μs may be set for a time duration of an individual signal pulse of about 256 μs. This results in a pulse repetition frequency of about 2.5 kHz. A time duration for the pause of about 244 μs can be defined in a second measurement cycle. The pulse repetition frequency is then 2 kHz. By way of example, the time duration for the pause in a third measurement cycle may be about 411 μs; the pulse repetition frequency in this case is 1.5 kHz. The relative velocity can then be determined unambiguously by comparison of the individual measurements from three measurement cycles; this increases the overall unambiguity area for the determination of the relative velocity. Therefore, the unambiguity area for the determination of the relative velocity can be changed without major effort by variation of the pulse repetition frequency.

As already stated, the unambiguity area for the range and/or that for the velocity are/is varied for at least two measurement cycles. This therefore results in ambiguous measured values for the range and/or ambiguous measured values for the relative velocity from a total of at least two measurement cycles. The final range and/or the final relative velocity can then be determined as a function of the measured values from each measurement cycle. This determination process will be described in more detail in the following text:

In one embodiment, so-called excess-range targets are eliminated for the determination of the range, that is to say those targets which are located outside the ambiguity areas. This means that there is no need to determine the range for excess-range targets. Whether an object is an excess-range object or is in fact located in the unambiguity area can be checked by evaluation of the measured values of each measurement cycle. By way of example, this can be done as follows: in a first measurement cycle, the radar transmits a sequence of frequency-modulated signal pulses with a first predetermined unambiguity area for the determination of the range. In a subsequent second measurement cycle, the radar transmits a different sequence of frequency-modulated signal pulses with a different second unambiguity area for the determination of the range. Finally, in a third measurement cycle, the radar transmits yet another sequence of frequency-modulated signal pulses with a different, third unambiguity area for the determined range. A plurality of measured values for the range are in each case available for the first, second and third measurement cycles, because of the respective unambiguity area and the ambiguities linked thereto. If the target is located in the respective unambiguity areas, then the respective first measured values in all the measurement cycles—that is to say measured values for the respective unambiguity area—therefore match one another. In this case, the final range is then determined and, specifically, corresponds to the measured values for the respective unambiguity areas. However, if these measured values do not match, then this indicates that the object is outside the unambiguity areas. Objects such as these are preferably filtered out, and are not indicated to the driver. This is because there is preferably no need to indicate objects which are at a distance of more than, for example, 100 m away from the motor vehicle. A maximum range of about 100 m is therefore sufficient for the desired applications. Instead of having to resolve the ambiguities for determination of the range, it is sufficient to suppress the targets outside the first unambiguity area. This makes it possible to avoid errors resulting from the resolution of the ambiguities.

This means that the range is determined without resolving ambiguities preferably only when a predetermined unambiguity criterion is satisfied which relates to those measured values from each measurement cycle which are in the respective unambiguity area. This predetermined unambiguity criterion may include the measured values from the respective unambiguity areas matching one another with a predetermined accuracy, specifically as already stated. If these measured values from the unambiguity areas in the measurement cycles do not match, then the range is not determined.

The target range is proportional to the frequency of the received signal in the radar receiver. In principle, excess ranges could therefore also be excluded by means of a low-pass filter with steep flanks. A filter such as this can filter out the target echoes from a specific frequency, and can thus eliminate excess ranges. A filter such as this can be used in addition to or as an alternative to the embodiment described above.

The determination of the relative velocity may include at least two possible (ambiguous) measured values for the relative velocity being determined for a first measurement cycle of the at least two measurement cycles—thus forming at least two hypotheses. It is then possible to use that measured value for which a predetermined detection criterion is satisfied as a final measured value for the relative velocity. By way of example, a tolerance value band can be defined around every possible measured value from the first measurement cycle. The predetermined detection criterion may then include at least a predetermined number of measured values from the other measurement cycles falling in the respective tolerance value band. This makes it possible to unambiguously determine the relative velocity of the object with respect to the radar, this precluding ambiguities.

By way of example, this embodiment may be implemented as follows: the radar transmits a first sequence of frequency-modulated signal pulses with a first unambiguity area for the determination of the relative velocity in a first measurement cycle. In principle, a single measured value for the relative velocity is initially obtained in the first measurement cycle; however, this measured value is not unambiguous. Because of ambiguities, further hypotheses and possible measured values to be expected are determined from this measured value. By way of example, two, three or more measured values to be expected may be determined. A tolerance value band—for example in the order of magnitude of the resolution of the relative velocity—is in each case defined, preferably symmetrically, around each of these possible measured values. In a further measurement cycle, the radar transmits a further sequence of frequency-modulated signal pulses, specifically with a second unambiguity area, for example a larger unambiguity area than in the first measurement cycle. By way of example, three measured values for the relative velocity are available from this second cycle. A check is now carried out to determine whether these measured values do or do not fall in any of the tolerance value bands. In a third measurement cycle, the radar transmits yet another sequence of frequency-modulated signal pulses, on this occasion with an even larger third unambiguity area for the relative velocity. This once again results in, for example, two, three or more measured values for the relative velocity, and a check is carried out to determine whether the same measured values fall in any of the defined tolerance value bands. Finally, a check is carried out to determine whether or not there are at least two measured values, for example, in any of the tolerance value bands. If this is the case, the predetermined detection criterion is satisfied, and that measured value for which the tolerance value band was defined is used as a final measured value for the relative velocity, specifically for example for further processing steps.

This means that mutually different unambiguity areas for the range and/or different unambiguity areas for the relative velocity are predetermined for at least two successive measurement cycles. The aim of this is to increase the overall unambiguity area of the overall measurement. In order to even further increase the accuracy for the determination of the range and/or of the relative velocity, specific conditions can be defined for the unambiguity areas of the individual measurement cycles.

By way of example, the mutually different unambiguity areas for the relative velocity can be predetermined on the basis that they do not have a common divisor. Furthermore, these different unambiguity areas for the relative velocity—as well as those for the range if the range is evaluated together with the relative velocity—are preferably defined such that the differences between the individual ambiguous measured values are greater than the tolerance value bands mentioned above. On the other hand, the variation of the unambiguity areas for the range should not be excessive, in order to avoid the range resolution deteriorating.

In the case of the unambiguity areas for the range, it has been found to be advantageous for said areas to be varied by about 2% to 4%.

A driver assistance device according to the invention is designed for unambiguous determination of a range to and/or of a relative velocity of an object with respect to a motor vehicle which has the driver assistance device. The driver assistance device comprises a FMCW radar which is designed to transmit a predetermined sequence of frequency-modulated signal pulses in a measurement cycle. An unambiguity area for the range and/or an unambiguity area for the relative velocity are/is determined by this sequence of frequency-modulated signal pulses. The driver assistance device furthermore comprises a signal processing device, which is designed to determine the range and/or the relative velocity as a function of a received signal. The mutually different unambiguity areas for the range and/or mutually different unambiguity areas for the relative velocity can be defined in the driver assistance device for at least two successive measurement cycles. Furthermore, the signal processing device is designed to determine the range and/or the relative velocity on the basis of in each case at least one measured value for the range and/or for the relative velocity from each measurement cycle.

A motor vehicle according to the invention comprises a driver assistance device according to the invention. The motor vehicle is preferably a passenger motor vehicle.

By way of example, the driver assistance device may be a monitoring system for a dead-angle range of the motor vehicle and/or an accident early-warning system, in particular for accidents involving an impact from the rear and/or an ACC (Additive Course Control) system.

The preferred embodiments described with reference to the method according to the invention, and their advantages, apply in a corresponding manner to the driver assistance device according to the invention, and to the motor vehicle according to the invention.

Further features of the invention will become evident from the claims, the figures and the description of the figures. All of the features and feature combinations mentioned in the description above, as well as the features and feature combinations mentioned in the following description of the figures and/or those shown solely in the figures can be used not only in the respectively stated combination but also in other combinations or on their own.

BRIEF DESCRIPTION OF THE DRAWINGS

The invention will now be explained in more detail using a single preferred exemplary embodiment, and with reference to the attached drawings, in which.

DETAILED DESCRIPTION OF THE INVENTION

Figure 1:
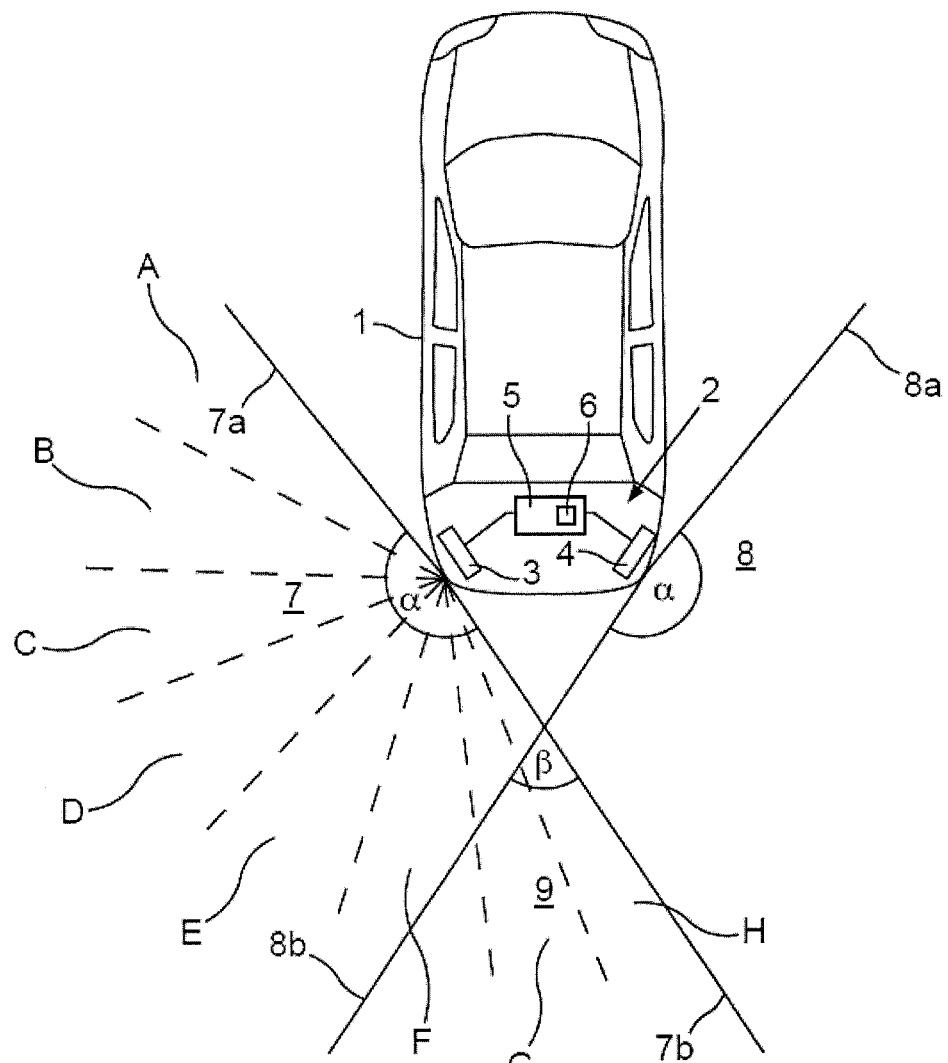
FIG. 1 shows a schematic illustration of a plan view of a motor vehicle according to one embodiment of the invention.

A motor vehicle 1 as illustrated in FIG. 1 comprises a driver assistance device 2 which assists the driver in controlling the motor vehicle 1. In the exemplary embodiment, the motor vehicle 1 is a passenger motor vehicle. By way of example, the driver assistance device 2 may be a monitoring system for the dead-angle range and/or an accident early-warning system, and/or an ACC system. The driver assistance device 2 comprises a first radar 3 and a second radar 4. The first radar 3 is arranged in a left-hand corner of a rear bumper, and the second radar 4 is arranged in a right-hand corner of the same bumper. The first and the second radars 3, 4 are frequency-modulation continuous-wave radars (frequency modulated continuous wave radar, FMCW radar).

The first and the second radars 3, 4 are coupled to a signal processing device 5. By way of example, said signal processing device 5 may comprise a microcontroller 6 which is shared by the first and second radars 3, 4, or else a digital signal processor, which is not illustrated in the figures. Alternatively, two microcontrollers 6 and/or two digital signal processors may be provided which communicate with one another, for example, via a communication bus which is provided in the motor vehicle 1.

The first radar 3 has a first detection area 7. The detection area 7 is defined in the horizontal direction by an azimuth angle range α, which is bounded in FIG. 1 by two lines 7a, 7b. Correspondingly, the second radar 4 has a detection area 8 which is defined by a corresponding azimuth angle range α, specifically in the horizontal direction. The azimuth angle range α is bounded by two lines 8a, 8b. The azimuth angle ranges α are about 170° in the exemplary embodiment. The detection areas 7, 8 of the radars 3, 4 intersect, thus resulting in an overlap area 9. The overlap area 9 is bounded in angle by the lines 7b, 8b. In the exemplary embodiment, an opening angle β of the overlap area 9 is about 70°.

The radars 3, 4 can locate objects in their respective detection areas 7, 8. In particular, the radars 3, 4 can determine a range to an object from the respective radar 3, 4, and also a relative velocity of an object with respect to the motor vehicle 1.

Figure 2:
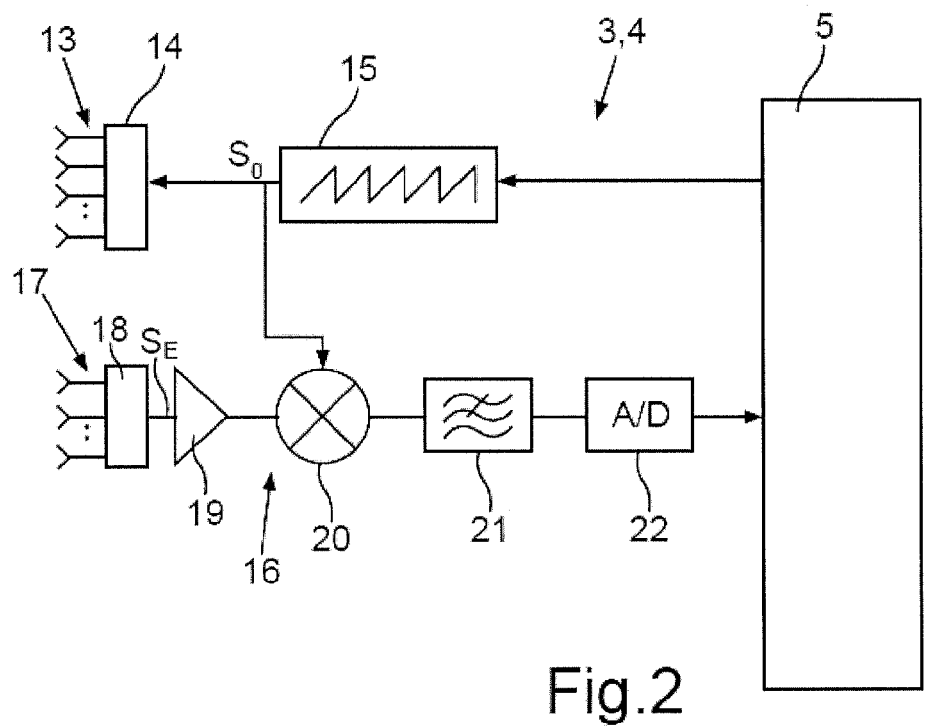
FIG. 2 shows a block diagram of a radar, as is used in the motor vehicle shown in FIG. 1.

FIG. 2 shows a block diagram of a single radar 3, 4, including the signal processing unit 5. The radar 3, 4 comprises a transmitting antenna unit 13, which may be an antenna array or antenna matrix, and may comprise a multiplicity of patch antennas. The transmitting antenna unit 13 is fed via a feed circuit 14. The transmitting antenna unit 13 is fed with the aid of a local oscillator 15 which produces a transmitted signal $S_0$. This transmitted signal $S_0$ is a frequency-modulated electromagnetic wave, whose frequency in its exemplary embodiment has a sawtooth-waveform profile. This will be explained in more detail further below with reference to FIG. 3. The transmitted signal $S_0$ is therefore frequency-modulated; its frequency varies periodically between a first frequency value and a second frequency value. The mid-frequency of the transmitted signal $S_0$ in the exemplary embodiment is 24 GHz.

The local oscillator 15 is controlled by the signal processing unit 5. By way of example, the oscillator 15 is a voltage-controlled oscillator, which produces the transmitted signal $S_0$ at a frequency which is dependent on the amplitude of a DC voltage, which is provided for the oscillator 15 by the signal processing unit 15.

The radar 3, 4 furthermore comprises a receiver 16. This receiver 16 comprises a receiver antenna unit 17 which, in the exemplary embodiment, may comprise a multiplicity of patch antennas. The receiving antenna unit 17 may likewise be a two-dimensional antenna matrix (array). The receiving antenna unit 17 is coupled to a feed circuit 18. The feed circuit 18 produces a signal $S_E$, which is a received signal. The received signal $S_E$ is amplified with the aid of a low-noise amplifier 19, down-mixed with the aid of a mixer 20, is low-pass-filtered with the aid of a low-pass filter 21, and is converted from analogue to digital form by means of an analogue/digital converter 22. The transmitted signal $S_0$ is used for down-mixing the received signal $S_E$; the transmitted signal $S_0$ is passed to the mixer 20, specifically for example with the aid of a directional coupler. The received digital signal $S_E$ is then processed with the aid of the signal processing device 5. By way of example, the signal processing device 5 uses the signal $S_E$ to determine the range to the object, as well as a relative velocity.

FIG. 2 shows an outline illustration of the radar 3, 4. By way of example, the radar 3, 4 may also include further receivers 16, each having a receiving antenna unit 17; the radar 3, 4 may likewise include a plurality of transmitting antenna units 13. Therefore, the radar 3, 4 is illustrated only by way of example in FIG. 2.

The method of operation of the radars 3, 4 will be described in more detail in the following text:

The transmitting antenna unit 13 and, to be more precise, the feed circuit 14, can be controlled such that it successively illuminates different subareas A, B, C, D, E, F, G, H of the detection area 7. By way of example, a transmission lobe of the transmitting antenna unit 13 can be steered electronically in the horizontal direction (based on the phased-array principle). In this case, the receiving antenna unit 17 may have a broad receiving characteristic in the horizontal direction, covering the entire detection area 7. Other refinements may alternatively or additionally provide narrow receiving angle ranges in conjunction with broad transmission lobes.

For the sake of clarity, FIG. 1 shows only the subareas A to H of the detection area 7 of the first radar 3. In this case, the detection area 8 of the radar 4 is correspondingly also subdivided into a plurality of subareas, which are covered successively by the radar 4. Although the following description relates only to the radar 3, the method of operation of the radar 4 corresponds to that of the radar 3.

Figure 3:
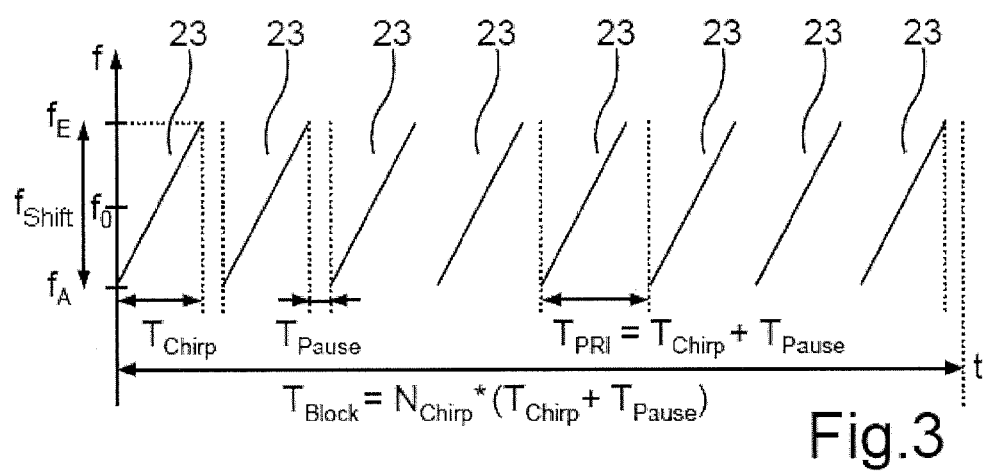
FIG. 3 shows a time sequence of linearly frequency-modulated signal pulses, which are transmitted by a radar for the driver assistance device.

The subareas A to H are covered successively by the radar 3 in a single measurement cycle. The radar 3 in each case separately transmits a predetermined sequence of frequency-modulated signal pulses (Chirps) for each subarea A to H (that is to say per beam) in a single measurement cycle. The radar 3 therefore in each case transmits a sequence of frequency-modulated signal pulses per measurement cycle and per subarea A to H. To be precise, the radar 3 in each case transmits a block of 16 to 64 frequency-modulated signal pulses. A block such as this or a sequence such as this of linearly frequency-modulated signal pulses 23 is illustrated in FIG. 3. The figure shows the function of a frequency f as a function of the time t. The parameters for the sequence of signal pulses 23 are:

- a time duration $T_{Chirp}$ of an individual frequency-modulated signal pulse,
- a time duration $T_{Pause}$ of a pause between the individual signal pulses 23,
- a number $N_{Chirp}$ of signal pulses within a block,
- a frequency shift $f_{Shift}$—a difference between an upper frequency $f_E$ and a lower frequency $f_A$,
- a mid-frequency $f_0$)=24 GHz.

The following parameters can be derived therefrom:
- a pulse repetition frequency PRF=1/($T_{Chirp}$ $T_{Pause}$) and
- a time duration of an overall block $T_{Block}=N_{Chirp}(N_{Chirp}$ $T_{Pause})$.

The frequency shift $f_{Shift}$ determines the resolution for determination of the range. The time duration $T_{Block}$ of the entire block in contrast determines the resolution of the Doppler frequency and therefore the resolution of the determination of the relative velocity. Furthermore, the pulse repetition frequency PRF determines an unambiguity area $V_{Un}$ for the determination of the relative velocity (the so-called Doppler unambiguity area). Furthermore, the frequency shift $f_{Shift}$, like a sampling rate of the analogue/digital converter 22, determines an unambiguity area $R_{Un}$ for the determination of the range (to the range unambiguity area).

The unambiguity area $R_{Un}$ for the range measurement is given by the following equation:

$$R_{Un} = \frac{f_A \cdot T_{Chirp}}{2} \cdot \frac{c}{2 \cdot f_{Shift}},$$

where c is the speed of light of $3 \times 10^8$ m/s and $f_A$ is the sampling rate of the analogue/digital converter 22.

The range resolution $\Delta R$ is given by the following formula:

$$\Delta R = \frac{c}{2 \cdot f_{Shift}}.$$

The unambiguity area $V_{Un}$ is given by the following relationship:

$$V_{Un} = PRF \cdot \frac{c}{2 \cdot f_0}.$$

Finally, the velocity resolution $\Delta V$ can be calculated as follows:

$$\Delta V = \frac{1}{T_{Block}} \cdot \frac{c}{2 \cdot f_0}.$$

The aim in the present case is to increase the overall unambiguity area for determination of the final relative velocity and of the range. The unambiguity area $V_{Un}$ for determination of the velocity is changed in the example between three successive measurement cycles by changing the pulse repetition frequency PRF. The ambiguities in the determination of the relative velocity are resolved for the overall velocity range from −200 km/h to +200 km/h. The unambiguity area $R_{Un}$ for determination of the range is likewise changed in the exemplary embodiment between three successive measurement cycles. This is achieved by changing the frequency shift $f_{Shift}$ from one measurement cycle to another. In this case, targets with a range of more than $R_{Un}$ are intended to be suppressed, and are not intended to be indicated to the driver. The following values are mentioned here purely by way of example:

Each first measurement cycle of three measurement cycles:

$N_{Chirp}=16$;

$T_{Chirp}=256$ µs;

$T_{Pause}=144$ µs;

PRF=1/400 µs=2.5 kHz;

$f_{Shift}=250$ MHz

Each second measurement cycle of three measurement cycles:

$N_{Chirp}=16$;

$T_{Chirp}=256$ µs;

$T_{Pause}=244$ µs;

PRF=1/500 µs=2 kHz;

$f_{Shift}=257$ MHz

Each third measurement cycle of three measurement cycles:

$N_{Chirp}=16$;

$T_{Chirp}=256$ µs;

$T_{Pause}=411$ µs;

PRF=1/667 µs=1.5 kHz;

$f_{Shift}=264$ MHz

The three measurement cycles therefore each result in different unambiguity areas $R_{Un}$, $V_{Un}$, both for the determination of the range and for the determination of the velocity. In the example described above, the unambiguity area $R_{Un}$ for the first measurement cycle is about 76.8 m, that for the second measurement cycle is about 74.7 m, and that for the third measurement cycle is about 72.7 m. The unambiguity area $V_{Un}$ for determination of the velocity is about 56.25 km/h for the first measurement cycle, about 45 km/h for the second measurement cycle, and about 34 km/h for the third measurement cycle.

After each measurement cycle, the signal processing unit 5 in each case determines a number of measured values both for the range and for the relative velocity, because of the respective ambiguities. The final range and the final relative velocity are determined by the signal processing device 5 as follows:

The signal processing device 5 takes each measured value determined in the first measurement cycle for the relative velocity, considers them as possible candidates for the final velocity value, and defines a tolerance value band for each such measured value. The value of the tolerance value band may correspond to the resolution of the Doppler frequency. Therefore, an identical tolerance value band is defined in each case around each measured value of the relative velocity from the first measurement cycle. In the second measurement cycle, the signal processing device 5 likewise determines ambiguous measured values for the relative velocity. The signal processing device 5 then checks which of the defined tolerance value bands the newly determined measured values fall in. The signal processing device 5 carries out a corresponding process in the third measurement cycle and, if appropriate, in further measurement cycles. If a predetermined number of measured values fall in one of the tolerance value bands, for example two measured values, then the measured value associated with this tolerance value band from the first measurement cycle is used as the final measured value for the relative velocity.

At the same time, in the first measurement cycle, the signal processing device 5 determines a number of ambiguous measured values for the range. A tolerance value band can also be defined in each case around the measured values for the range. However, in the exemplary embodiment, the only measured value which is of interest for the range is that which is located in the unambiguity area of the first measurement cycle. The signal processing device 5 checks whether those measured values from the second and third, and if appropriate, every further measurement cycle which are located in the respective unambiguity area correspond to the measured value from the unambiguity area of the first measurement cycle. The tolerance value band in this case means that, even with high-precision measurements, the measured values in different measurement cycles may differ from one another. Thus, if the measured values from the unambiguity area of the second and third measurement cycles fall in the tolerance value band around the measured value from the unambiguity area from the first measurement cycle, the object is located in the respective unambiguity areas. The object is then indicated, and the measured value from the unambiguity area of the first measurement cycle is used as the final measured value for the range. In contrast, if the measured values from the respective unambiguity areas of all the measurement cycles do not match, then this indicates that the object is located outside the unambiguity areas. In this case, the object is filtered out, and the range is not determined. These are so-called excess-range objects.

Thus, overall, a method and a driver assistance device are provided which allow unambiguous determination of a range to and a relative velocity of an object with respect to a motor vehicle 1. Overall, a very large unambiguity area is achieved for the overall measurement of the range and of the relative velocity. To be precise, at least two measurement cycles are provided, whose unambiguity areas from a range and/or whose unambiguity areas for the relative velocity differ from one another, with these unambiguity areas being determined in advance. The signal processing device 5 then determines the range and the relative velocity on the basis of the respective measured values for the range and/or for the relative velocity from each measurement cycle.

The invention claimed is:

1. A method for unambiguous determination of a range to and of a relative velocity of an object with respect to a motor vehicle using a frequency-modulation continuous-wave radar in the motor vehicle, the method comprising:
    transmitting predetermined sequences of frequency-modulated signal pulses by the frequency-modulation continuous-wave radar in a measurement cycle;
    determining an unambiguity area ($R_{Un}$) for the range and an unambiguity area ($V_{Un}$) for the relative velocity, based on the predetermined sequences;
    defining mutually different unambiguity areas ($R_{Un}$) for the range and mutually different unambiguity areas ($V_{Un}$) for the relative velocity for at least two successive measurement cycles;
    determining the range and the relative velocity on the basis of, in each case, at least one measured value for the range or for the relative velocity from each of the at least two successive measurement cycles;
    defining a tolerance band around every measured value for the range from a first measurement cycle of the at least two successive measurement cycles;
    determining whether the measured value for the range from a successive measurement cycle of the at least two successive measurement cycles is within the tolerance band;
    indicating an object located at the measured value for the range from the successive measurement cycle of the at least two successive measurement cycles if the measured value for the range from the successive measurement cycle of the at least two successive measurement cycles is determined to be within the tolerance band; and
    filtering out the measured value for the range from the successive measurement cycle of the at least two successive measurement cycles if the measured value for the range from the successive measurement cycle of the at least two successive measurement cycles is determined to be outside of the tolerance band,
    wherein the definition of different unambiguity areas ($R_{Un}$) for the range comprises mutually different frequency shifts ($f_{Shift}$) being set for respective sequences of frequency-modulated signal pulses,
    wherein the definition of different unambiguity areas ($V_{Un}$) for the relative velocity comprises mutually different pulse repetition frequencies (PRF) being set for the respective sequences of frequency-modulated signal pulses,
    wherein mutually different pulse repetition frequencies (PRF) are set by variation of a time duration ($T_{Pause}$) of a pause between each frequency-modulated signal pulse of each of the predetermined sequences, and
    wherein the mutually different frequency shifts ($f_{Shift}$) and the mutually different pulse repetition frequencies (PRF) are selected during operation of the frequency-modulation continuous-wave radar.

2. The method according to claim 1, wherein without resolving unambiguities, the range is determined only when a predetermined unambiguity criterion is satisfied which relates to the at least one measured value from each measurement cycle which is in the respective unambiguity area.

3. The method according to claim 2, wherein the predetermined unambiguity criterion comprises measured values from the respective unambiguity areas matching one another with a predetermined accuracy.

4. The method according to claim 1, wherein the determination of the relative velocity comprises at least two possible measured values for the relative velocity being determined for a first measurement cycle of the at least two measurement cycles, and the at least one measured value for which a predetermined detection criterion is satisfied being used as final measured values for the relative velocity.

5. The method according to claim 1, wherein the mutually different unambiguity areas for the relative velocity are predetermined such that they do not have a common divisor.

6. A driver assistance device for unambiguous determination of a range to and of a relative velocity of an object with respect to a motor vehicle, comprising:
    a frequency-modulation continuous-wave radar configured to transmit predetermined sequences of frequency-modulated signal pulses in a measurement cycle, wherein an unambiguity area ($R_{Un}$) is determined for the range and an unambiguity area ($V_{Un}$) is determined for the relative velocity by the predetermined sequences, and a signal processing device for determination of the range and of the relative velocity as a function of a received signal, wherein:

mutually different unambiguity areas ($V_{Un}$) are defined by setting mutually different pulse repetition frequencies (PRF) for the respective sequences of frequency-modulated signal pulses, the mutually different pulse repetition frequencies (PRF) being set by variation of a time duration ($T_{Pause}$) of a pause between each frequency-modulated signal pulse of each of the predetermined sequences;

mutually different unambiguity areas ($R_{Un}$) are defined by setting mutually different frequency shifts ($f_{Shift}$) for the respective sequences of frequency-modulated signal pulses;

mutually different unambiguity areas ($V_{Un}$) for the relative velocity and mutually different unambiguity areas ($R_{Un}$) for the relative range are defined in the driver assistance device for at least two successive measurement cycles;

the signal processing device is configured to determine the range and the relative velocity on the basis of, in each case, at least one measured value for the range or for the relative velocity from each measurement cycle;

the mutually different frequency shifts ($f_{Shift}$) and the mutually different pulse repetition frequencies (PRF) are selected during operation of the diver assistance device;

a tolerance band is defined around every measured value for the range from a first measurement cycle of the at least two successive measurement cycles the measured value for the range from a successive measurement cycle of the at least two successive measurement cycles is compared to the tolerance band;

if the measured value for the range from the successive measurement cycle of the at least two successive measurement cycles is within the tolerance band, an object located at the measured value for the range from the successive measurement cycle is indicated by the driver assistance device; and if the measured value for the range from the successive measurement cycle of the at least two successive measurement cycles is outside of the tolerance band, the measured value for the range from the successive measurement cycle of the at least two successive measurement cycles is filtered out.

7. A motor vehicle having a driver assistance device according to claim 6.

* * * * *